(12) United States Patent
Sheahan et al.

(10) Patent No.: US 7,128,498 B2
(45) Date of Patent: Oct. 31, 2006

(54) METHOD OF CONTAINING AND AT LEAST PARTIALLY REMEDIATING CONTAMINANTS IN SOILS, INCLUDING SEDIMENTS

(75) Inventors: Thomas Clair Sheahan, Wellesley, MA (US); Akram N. Alshawabkeh, Franklin, MA (US); Karen Sue Henry, Lyme, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/194,641

(22) Filed: Aug. 2, 2005

(65) Prior Publication Data

US 2006/0222462 A1    Oct. 5, 2006

Related U.S. Application Data

(62) Division of application No. 10/115,088, filed on Apr. 4, 2002.

(60) Provisional application No. 60/283,291, filed on Apr. 11, 2001.

(51) Int. Cl.
*B09B 1/00* (2006.01)

(52) U.S. Cl. .............. 405/128.75; 405/129.25

(58) Field of Classification Search .......... 405/128.75, 405/129.25, 129.65, 129.75
See application file for complete search history.

(56) References Cited

U.S. PATENT DOCUMENTS

| | | | |
|---|---|---|---|
| 4,424,248 A | 1/1984 | Tesch et al. | |
| 4,692,059 A * | 9/1987 | Juutilainen | 405/63 |
| 5,041,330 A | 8/1991 | Heerten et al. | |
| 5,601,906 A | 2/1997 | Henry | |
| 5,877,096 A | 3/1999 | Stevenson et al. | |
| 5,911,539 A * | 6/1999 | Egan et al. | 405/20 |
| RE37,295 E | 7/2001 | Heerten et al. | |
| 6,284,681 B1 * | 9/2001 | Langton et al. | 442/417 |
| 6,505,996 B1 | 1/2003 | Ianniello et al. | |
| 6,599,058 B1 | 7/2003 | Arnold | |
| 6,612,779 B1 | 9/2003 | Scuero | |

FOREIGN PATENT DOCUMENTS

EP    437723 A    *  7/1991

* cited by examiner

*Primary Examiner*—John Kreck
(74) *Attorney, Agent, or Firm*—Earl H. Baugher, Jr.

(57) ABSTRACT

In one application for containing and remediating contaminants in sediments, employing a geocomposite eliminates the need for a thick cap or removal and subsequent ex situ treatment of the sediment. A geocomposite with at least one layer of reactive material is placed over the area to be remediated. A layer of available surcharge materials such as sand, gravel, or riprap covers the geocomposite. The weight of the surcharge materials causes pore water to flow from the sediment through the reactive layer or layers. Contaminants may be trapped in this reactive layer or layers. A top or bottom layer, or both a top and bottom layer, may be provided to inhibit incursion from outside the sediment layer, while permitting appropriate flow direction of pore water into the reactive layer or layers.

16 Claims, 1 Drawing Sheet

METHOD OF CONTAINING AND AT LEAST PARTIALLY REMEDIATING CONTAMINANTS IN SOILS, INCLUDING SEDIMENTS

RELATED APPLICATIONS

This application claims the benefit of prior co-pending U.S. Provisional Patent Application Ser. No. 60/283,291, Reactive Geocomposite For Remediating Contaminated Sediments, by Sheahan et al., filed Apr. 11, 2001 and is a division of prior co-pending U.S. patent application Ser. No. 10/115,088, An Installation Incorporating a Reactive Layer for at Least Partially Remediating Contamination, by Sheahan et al., filed Apr. 4, 2002.

STATEMENT OF GOVERNMENT INTEREST

Under paragraph 1(a) of Executive Order 10096, the conditions under which this invention was made entitle the Government of the United States, as represented by the Secretary of the Army, to an undivided interest in any patent granted thereon by the United States. This and related patents are available for licensing. Please contact Jeff Walaszek at 703 428-6724 or Phillip Stewart at 601 634-4113.

BACKGROUND

Conventional isolation or treatment of contaminated soils and sediments is by either "capping" or removal. Capping may use natural materials such as soils or gravel, or geosynthetic layers, or a combination of any of these.

Capping systems comprised of soil or gravel layers are relatively thick and prone to erosion and disturbance. This may cause mixing with the adjacent contaminated soil or sediment. In sub-aqueous applications, such as harbors or shipping channels, thick caps may present obstructions to ships. The cap may be damaged by the turbulence caused by ship traffic as well as by direct contact. Additionally, these thick caps are not designed to interact with any contaminant chemicals that may be in the pore fluid.

Contaminated sediment (sub-aqueous or otherwise) may be removed for ex situ treatment, simple off-site storage, or both. However, sub-aqueous sediment removal is expensive and can result in significant contaminant re-suspension in the overlying water column during removal of the sediment.

Embodiments of the present invention address the above deficiencies in a cost-effective manner.

SUMMARY

In select embodiments of the present invention, at least one chemically reactive layer is sandwiched between layers of geosynthetic material that may comprise multiple additional layers. The resultant composite is a barrier that may also treat contaminants, e.g., contaminants in sediment. The reactive layer or layers constitutes an active "clean-up" element that concentrates contaminants in a very thin zone, neutralizes contaminants, or does both. Simultaneously, contaminated sediment is isolated from overlying water or the atmosphere by a structure comprising the sandwiched reactive layer (or layers) itself and a cover or surcharge layer. This inhibits erosion from movement of either moisture or air, while also inhibiting re-suspension of contaminants. Because the sandwiched structure is thin compared to conventional "caps," it is suited for use in sub-aqueous applications such as shipping channels and harbors. Further, select embodiments of this invention may be removed, or "rejuvenated" to achieve further interaction with pore fluids containing dissolved contaminants or chemicals sorbed onto small particles.

In select embodiments of the present invention, a geosynthetic structure or system is used for remediating contaminated sediments. Embodiments of the structure may include a top layer of geosynthetic material, one or more middle layers of reactive material, and a bottom layer of geosynthetic material. Depending on site conditions, the top or bottom layer, or both the top and bottom layers of geosynthetic material, may be omitted and achieve the same functionality. The geosynthetic material may be selected from that commercially available, i.e., commercial-off-the-shelf (COTS) products, and may be woven or non-woven. Likewise, the reactive material may be chosen from that commercially available including: activated carbon, zeolites, particulate polymers, granular forms of commercially available chemical adsorption materials, activated carbon fabric commercially available in sheets, and geosynthetic drainage net incorporating pores for holding granular reactive material, and combinations of these.

In select embodiments of the present invention, a method is provided for remediating contaminated sediments. When configurations used with embodiments of the present invention are employed to treat contaminants, a layer of surcharge materials may be overlaid to facilitate flow of pore water from sediment through the configuration. Configurations of the present invention may be employed horizontally, such as laying a geocomposite over sediments in a harbor or ship channel, or vertically, such as pressing the multi-layered configuration into soft soil to capture horizontally flowing pore water.

Advantages of configurations used with select embodiments of the present invention include:
- use conventional geosynthetic materials for ease in fabrication of the structure;
- reduce encroachment on shipping lanes as compared to conventional caps;
- resist erosion or other deterioration because of enhanced stability and tensile strength;
- capture solid contaminants and chemicals sorbed onto small particles that are pulled from the sediments via the consolidation induced by the surcharge layer as opposed to simple isolation of conventional capping;
- render some chemicals less toxic or insoluble depending on specific reactions occurring in the reactive layer;
- provide an alternative site remediation tool in soft soils that may be inherently difficult to remediate;
- reduce expense when compared to conventional methods of removal and treatment;
- facilitate reuse via removing from service and re-constituting the reactive layer;
- is accepted readily by regulatory bodies and the public; and
- minimizes disturbance of the environment as compared to conventional methods.

BRIEF DESCRIPTION OF DRAWINGS

Like numbers depict like elements in all figures.

DETAILED DESCRIPTION

Figure 1:
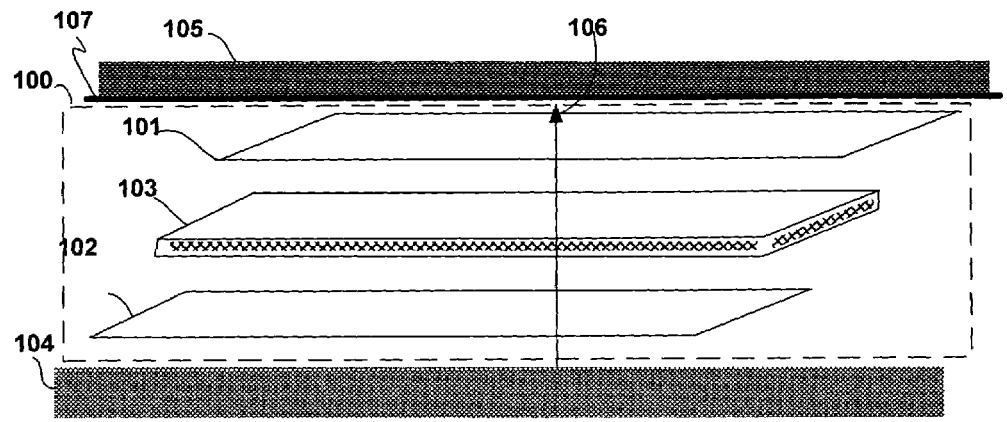
FIG. 1 depicts a side view of layers of a configuration that may be employed with select embodiments of the present invention as used in a single plane that may be horizontal.
Figure 2:
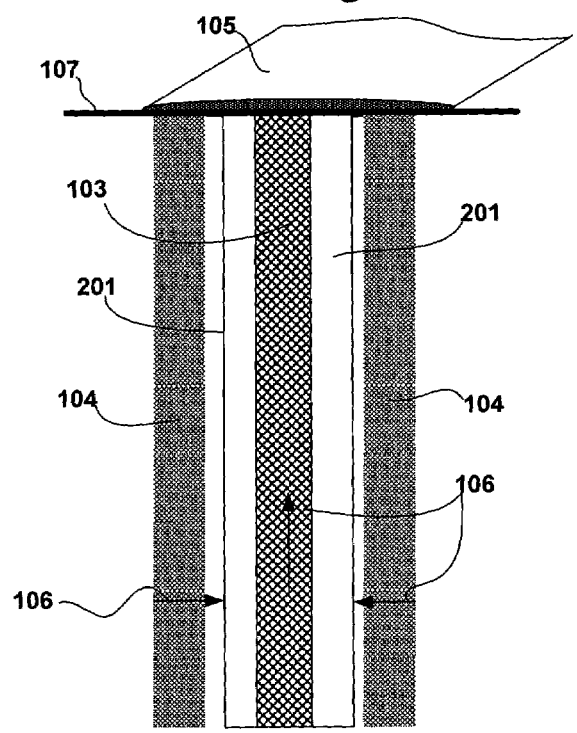
FIG. 2 depicts a cross-section view of a configuration that may be employed with select embodiments of the present invention as used in a vertical configuration for lateral fluid flow collection.

Refer to FIGS. 1 and 2. In select embodiments of the present invention, methods are employed to inhibit dispersal of harmful environmentally mobile chemicals in areas likely to hold them, such as sediments 104. While inhibiting movement, select methods of the present invention may also chemically neutralize or physically immobilize one or more of these mobile chemicals.

Select embodiments of the present invention employ a reactive "sandwich" structure 100 incorporating at least one reaction layer 103 that may be an inner, or middle, layer. In one configuration, the structure 100 also comprises two layers of geotextiles, one being a top layer 101, and the other being a bottom layer 102. Conventional geotextiles may be employed. These generally are fabricated as synthetic sheets of material that may be woven or non-woven. The reactive layer 103 may comprise: activated carbon, zeolites, particulate polymers, and granular forms of available chemical adsorption materials. Commercially available products, i.e., COTS products that may facilitate fabrication include activated carbon fabric available in sheets and geosynthetic drainage net incorporating pores for holding granular reactive material.

In one application, the structure 100 separates contaminated sediments 104 from adjacent uncontaminated material 107. Pore fluid 106 and some small solid particles (not separately shown) contained therein are induced to flow through the structure 100. One method of inducing flow of the pore fluid is by applying an overlying surcharge layer 105 to the employed sandwiched geosynthetic configuration 101, 102, 103. The combination of the surcharge layer 105 and the sandwiched geosynthetic configuration 101, 102, 103 comprises the structure 100. The weight of the surcharge materials facilitates consolidation within the targeted sediment 104. Employed in a horizontal configuration as depicted in FIG. 1, the bottom layer 102 retards passage of at least some suspended particles so that pore fluid 106 and dissolved chemicals enter the geocomposite structure's reactive layer (or layers) 103. Depending on the makeup of this bottom layer 102, very fine solid particles may pass to the reactive layer 103. The reactive layer 103 interacts with chemicals in the contaminated sediment 104 that pass through the bottom layer, the pore fluid 106 itself within the structure 100, or both. The top layer 101 prevents overlying particles (not separately shown) from engaging the middle or reactive layer 103, while allowing the pore fluid 106 to pass completely through the structure 100 into the overlying surcharge layer 105.

Referring again to FIG. 1, in one configuration, the fabricated material layers 101, 102, 103 used in the structure 100 may be fabricated in large sheets, e.g., rolls of 30 m (100 ft) in length or more by 3–4.6 m (10–15 ft) in width. These sheets may be deployed on the surface of a sediment deposit 104. The deposit 104 may be saturated or near saturated, sub-aqueous or terrestrial. After emplacement of the material layers 101, 102, 103, a layer 105 of surcharge materials, such as riprap, gravel, or sand, is placed on the material layers 101, 102, 103 to facilitate consolidation of the sediment 104.

Subsequent consolidation of the sediment 104 expulses pore fluid 106 that contains targeted harmful chemicals or small particles upon which the chemicals may be sorbed. As the pore fluid 106 flows through the geocomposite structure 100, the reactive material in the reactive layer or layers 103, interacts with the chemicals in the fluid 106. For example, the reactive material may simply adsorb them. Alternatively, it may also chemically "neutralize" them. This both isolates and concentrates the targeted chemicals within the reactive layer 103, or layers. In addition, this reactive layer 103, or layers, may retain fine particles on which chemicals may have sorbed.

Refer to FIG. 2. An embodiment of the present invention may also be employed as a structure sandwiching one or more reactive layers oriented vertically, having an outer layer 201, or layers, and at least one middle reactive layer 103. This embodiment may be emplaced vertically by pressing it into the ground. A surcharge layer 105 of material such as gravel, sand, or riprap may be emplaced above the soil adjacent to the vertically oriented sandwiched reactive layer 103 and the consolidation of the sediment 104 may occur both horizontally and vertically, due to the weight of the surcharge layer 105. In a configuration installed vertically, the structure, now essentially the reactive layer 103, may employ a sleeve 201 surrounding the reactive layer 103, thus forming a continuous outer layer for the structure, much like a sack used to protect a mattress when moving. One or more layers 103 of reactive material may be emplaced inside the sleeve 201 (i.e., the continuous outer layer or layers).

Although specific methods for employing configurations sandwiching geosynthetic material are discussed, similar methods, including those that may have only some of the steps used in the above described examples, may be suitable for containment, remediation, or both, using a method that falls within the ambit of a preferred embodiment of the present invention as provided in the claims herein.

We claim:

1. A method for containing and at least partially remediating contaminants, said contaminants contained in sediments below the surface of a body of water, comprising:

deploying a geocomposite in a plane to cover said sediments, said geocomposite having a width and length defining said plane, each of said width and length much greater than the thickness of said geocomposite, said geocomposite comprising at least one layer of geosynthetic material, wherein at least one of said layers comprises at least some reactive material; and covering said geocomposite with a layer of surcharge materials, wherein the weight of said surcharge materials is sufficient to force fluid up through said geocomposite.

2. The method of claim 1 distributing said layer of surcharge materials over a topmost layer of said geocomposite along said plane.

3. The method of claim 2 said plane being approximately horizontal.

4. The method of claim 1 said geosynthetic material being a COTS item.

5. The method of claim 4 selecting said COTS geosynthetic material from the group consisting of: woven, non-woven, and combinations of woven and non-woven geosynthetic material.

6. The method of claim 1 said reactive material being a COTS item.

7. The method of claim 6 selecting said COTS reactive material from the group consisting of: activated carbon, zeolites, particulate polymers, granular forms of commercially available chemical adsorption materials, activated carbon fabric commercially available in sheets, and combinations thereof.

8. The method of claim 1 selecting said surcharge materials from the group consisting of: riprap, gravel, sand, and combinations thereof.

9. The method of claim 1 providing multiple layers of said geocomposite, each of said layers arranged approximately parallel to each other in said plane.

10. The method of claim 9 providing said at least multiple layers as a bottom layer, a top layer, and at least one layer sandwiched between said bottom and top layers, said sandwiched layers containing said reactive material.

11. The method of claim 9 providing said multiple layers as a bottom layer and at least one layer containing said reactive material placed upon said bottom layer.

12. The method of claim 9 providing said multiple layers as at least one layer containing said reactive material and a top layer placed upon said layers containing reactive materials.

13. The method of claim 1 further comprising removing said surcharge materials and replacing at least part of said geocomposite and said surcharge materials.

14. The method of claim 13 said part of said geocomposite being at least one said reactive layers.

15. A method for containing and at least partially remediating contaminants in soft soil, comprising:
   deploying a geocomposite in an approximately vertical plane, said geocomposite having a width and length defining said plane, each of said width and length much greater than the thickness of said geocomposite, said geocomposite comprising at least one layer of geosynthetic material,
wherein at least one of said layers comprises at least some reactive material;
   deploying at least one sleeve completely enclosing said at least one layer; and covering said geocomposite with a layer of surcharge materials by deploying said layer of surcharge materials above a topmost edge of said geocomposite and horizontally over the surface adjacent to said topmost edge for the length of said topmost edge.

16. The method of claim 15 deploying said geocomposite by pressing said geocomposite into said soft soil.

* * * * *